US007029214B2

(12) United States Patent
Shiba et al.

(10) Patent No.: US 7,029,214 B2
(45) Date of Patent: Apr. 18, 2006

(54) LINEAR GUIDE APPARATUS

(75) Inventors: Kazuhiro Shiba, Numazu (JP); Yoshiaki Kai, Numazu (JP); Takao Date, Shizuoka-Ken (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 52 days.

(21) Appl. No.: 10/767,264

(22) Filed: Jan. 30, 2004

(65) Prior Publication Data

US 2004/0184684 A1 Sep. 23, 2004

(30) Foreign Application Priority Data

Jan. 31, 2003 (JP) .................................... 2003-023677

(51) Int. Cl.
*B23C 9/00* (2006.01)
*B23Q 1/26* (2006.01)
*B23Q 1/40* (2006.01)
*F16C 29/10* (2006.01)
*F16C 29/12* (2006.01)

(52) U.S. Cl. ...................... 409/241; 409/141; 408/143; 408/234; 384/7; 384/43; 188/43; 188/166

(58) Field of Classification Search ................ 409/241, 409/141, 235, 238, 218, 214, 220; 408/143, 408/69, 234; 384/7, 43–45; 188/43, 166, 188/73.35, 73.36, 73.37
See application file for complete search history.

(56) References Cited

U.S. PATENT DOCUMENTS

| | | | | | |
|---|---|---|---|---|---|
| 3,198,588 | A | * | 8/1965 | Cashman et al. | 384/54 |
| 4,529,255 | A | * | 7/1985 | Piotrowski | 384/7 |
| 4,773,770 | A | * | 9/1988 | Osawa et al. | 384/45 |
| 4,953,988 | A | * | 9/1990 | Tsukada | 384/45 |
| 5,181,780 | A | * | 1/1993 | Morita | 384/8 |
| 5,205,204 | A | * | 4/1993 | Gottling et al. | 188/170 |
| 5,268,970 | A | * | 12/1993 | Tanaka | 384/43 |
| 5,273,367 | A | * | 12/1993 | Tanaka | 384/45 |
| 5,281,029 | A | * | 1/1994 | Morita | 384/8 |
| 5,678,663 | A | * | 10/1997 | Watanabe et al. | 188/67 |
| 5,732,799 | A | * | 3/1998 | Chikamatsu et al. | 188/67 |
| 6,227,336 | B1 | * | 5/2001 | Rudy | 188/43 |
| 6,336,528 | B1 | * | 1/2002 | Rudy | 188/43 |
| 6,561,049 | B1 | * | 5/2003 | Akiyama et al. | 384/49 |
| 6,848,326 | B1 | * | 2/2005 | Akiyama et al. | 384/43 |
| 2001/0016087 | A1 | * | 8/2001 | Akiyama et al. | 384/17 |
| 2003/0094334 | A1 | * | 5/2003 | Hsu et al. | 188/67 |
| 2004/0099492 | A1 | * | 5/2004 | Onuki et al. | 188/163 |

FOREIGN PATENT DOCUMENTS

| | | | | |
|---|---|---|---|---|
| DE | 4116795 | A1 | * | 11/1992 |
| DE | 19533077 | A1 | * | 3/1996 |
| DE | 19533077 | C2 | | 3/1996 |
| DE | 4438948 | A1 | | 5/1996 |
| DE | 19544534 | A1 | | 6/1997 |
| DE | 19738987 | A1 | | 9/1998 |
| EP | 861990 | A2 | * | 9/1998 |
| EP | 936366 | A2 | * | 8/1999 |
| JP | 7-54845 | A | * | 2/1995 |
| JP | 9-217743 | | | 8/1997 |
| JP | 9-329141 | | | 12/1997 |
| JP | 2001009655 | | | 1/2001 |

* cited by examiner

*Primary Examiner*—Erica Cadugan
(74) *Attorney, Agent, or Firm*—Pillsbury Winthrop Shaw Pittman LLP

(57) ABSTRACT

There is provided a linear guide apparatus which, owing to the use of a gap-free braking device in a rolling guide, has a sufficiently high damping capacity. The linear guide apparatus for guiding a linear motion of a movable body along a guide rail on a fixed structure in a machine tool, includes: a rolling guide section including a rolling element for rolling on a rolling element-rolling surface of the guide rail; and a brake section for enhancing the damping capacity of the rolling guide section, the brake section including a pair of brake shoes, having a flexible structure, for sliding on the rolling element-rolling surface of the guide rail.

6 Claims, 4 Drawing Sheets

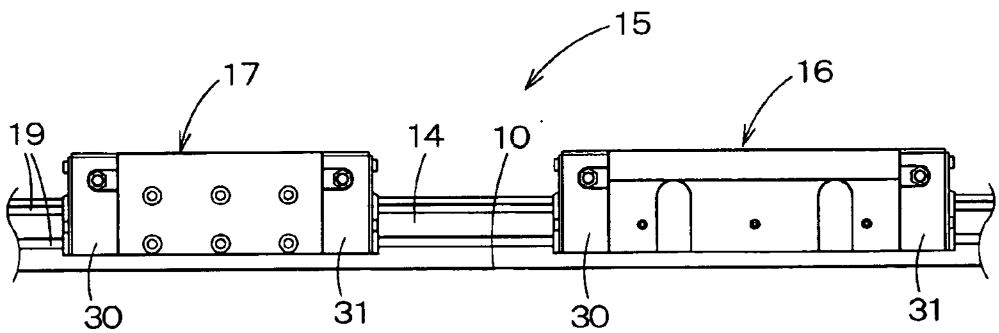
F I G. 3
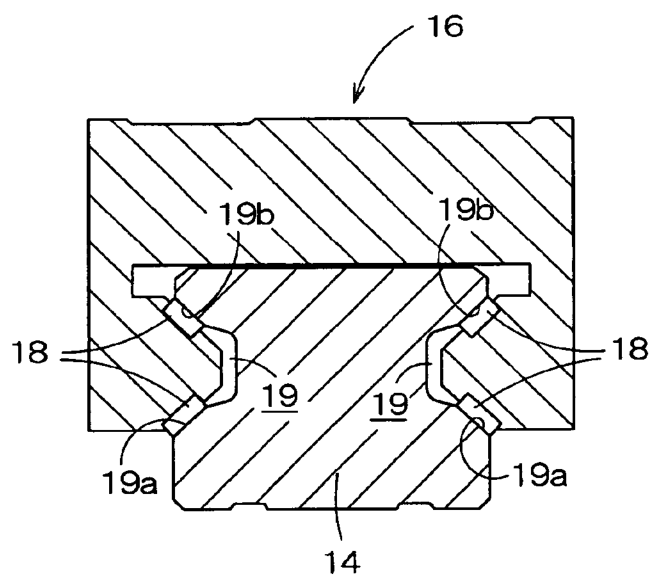
F I G. 4

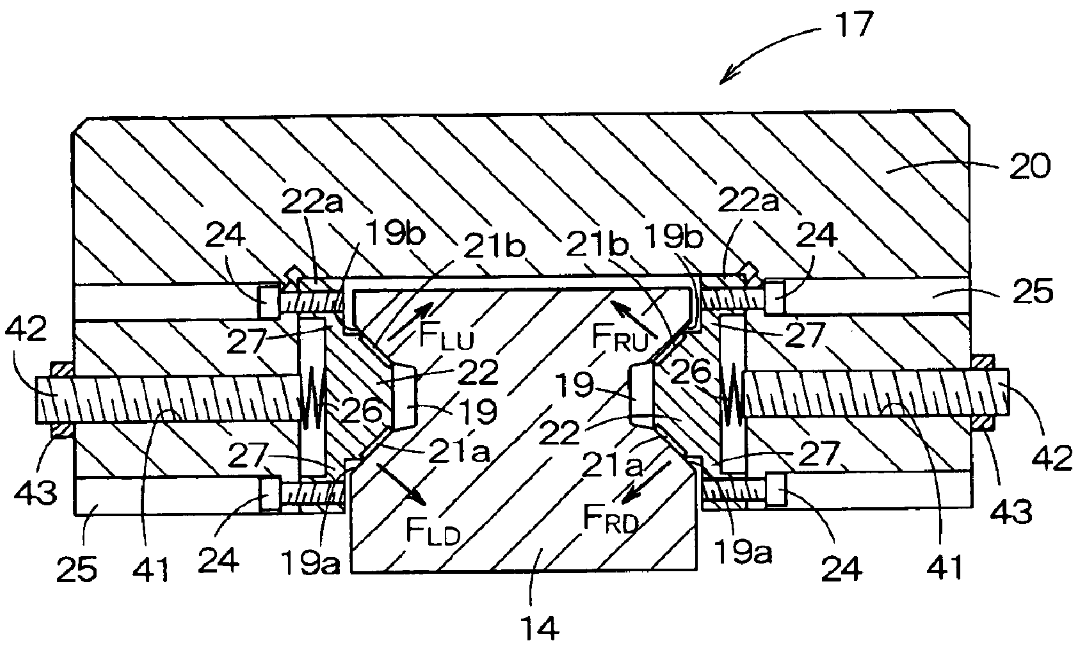
F I G. 7
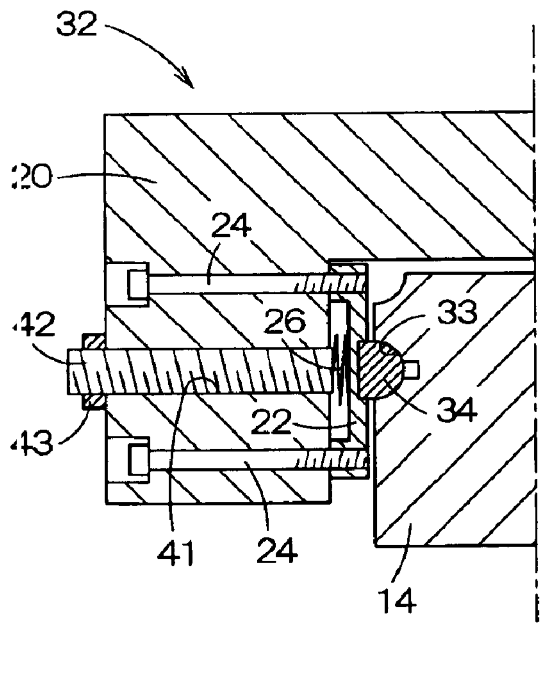
F I G. 8

LINEAR GUIDE APPARATUS

BACKGROUND OF THE INVENTION

1. Field of the Invention

This invention relates to a linear guide apparatus for guiding a movable body, such as a table, in a machine tool.

2. Description of the Related Art

In machine tools, sliding guides and rolling guides are primarily employed in guide mechanisms for movable bodies, such as columns, spindle heads, tables, etc.

Sliding guides, in which a sliding member makes a sliding contact with a guide surface, have a high static rigidity and, as compared to rolling guides, are excellent in damping of vibrations that could cause fluttering.

On the other hand, rolling guides, which utilize a rolling contact between a rolling member and a guide surface, have a low vibration damping capacity. Because of low frictional force, however, rolling guides are superior in high speed and motion accuracy to sliding guides. Thus, sliding guides and rolling guides have advantages in terms of each other's disadvantages, and have disadvantages in terms of each other's advantages.

Linear guide apparatuses have recently been developed which, with a view to compensating for the drawback of rolling guide, employ a braking mechanism, etc. in a rolling guide to generate a frictional force, thereby enhancing the damping capacity of the rolling guide. Such conventional linear guide apparatuses include an apparatus in which an elastic bag is expanded by air pressure so as to press a damping plate against a brake rail (see Japanese Patent Laid-Open Publication No. 1997-217743), an apparatus in which a brake plate is deformed by the action of a pressurized fluid so as to press the plate against a track rail (see Japanese Patent Laid-Open Publication No. 1997-329141), and an apparatus in which brake shoe is pressed against a guide rail by means of a hydraulic biasing device (see Japanese Patent Laid-Open Publication No. 2000-9655).

The conventional linear guide apparatuses thus utilize either a hydraulic pressure or air pressure to apply a load to a rail so as to generate a frictional force, which necessarily makes the braking mechanism for enhancing vibration damping complicated. Further, with such a breaking mechanism, a gap may be formed between a braking or damping member and a guide rail. The presence of even a very small gap causes an uncontrollable minute displacement of the braking or damping member in the gap direction, whereby the desired damping capacity cannot be obtained.

SUMMARY OF THE INVENTION

It is therefore an object of the present invention to solve the above-described problems in the prior art and provide a linear guide apparatus which, owing to the use of a gap-free braking device in a rolling guide, has a sufficiently high damping capacity.

In order to achieve the above object, the present invention provides a linear guide apparatus for guiding a linear motion of a movable body along a guide rail on a fixed structure in a machine tool, comprising: a rolling guide means including a rolling element for rolling on a surface of the guide rail; and a brake means for enhancing the damping capacity of the rolling guide section, wherein said brake section includes a pair of brake shoes, having a flexible structure, for sliding on the rolling element-rolling surface of the guide rail.

The brake section of the linear guide apparatus according to the present invention, unlike the conventional braking devices, has a flexible structure and does not have such a complicated mechanism or a hard structure that would form a gap between a brake shoe and a guide rail. The brake section can securely provide the linear guide apparatus with a sufficient damping capacity.

In a preferred embodiment of the present invention, an elastic member, biasing each brake shoe so that the brake shoe presses on the rolling element-rolling surface of the guide rail, is provided in the rear of the brake shoe. In this embodiment, the brake shoe preferably has a thin portion that allows a bend of the brake shoe by the force applied from the elastic member.

It is preferred that the sliding surface of each brake shoe be comprised of a sliding member, such as a resin sliding member or an oil-free metal sliding member. Further, it is preferred that each brake shoe be fastened to the brake section by means of a plurality of adjustment bolts which adjust the pressing force of the brake shoe so that it acts evenly on the rolling element-rolling surface of the guide rail.

BRIEF DESCRIPTION OF THE DRAWINGS

FIG. 3 is a side view of the linear guide apparatus;

FIG. 4 is a cross-sectional view of the rolling guide section of the linear guide apparatus;

FIG. 7 is a cross-sectional view, partly omitted, of the brake section of a linear guide apparatus according to a third embodiment of the present invention; and FIG. 8 is a cross-sectional view, partly omitted, of the brake section of a linear guide apparatus according to a fourth embodiment of the present invention.

DETAILED DESCRIPTION OF THE PREFERRED EMBODIMENTS

Preferred embodiments of the present invention will now be described with reference to the drawings.

Figure 1:
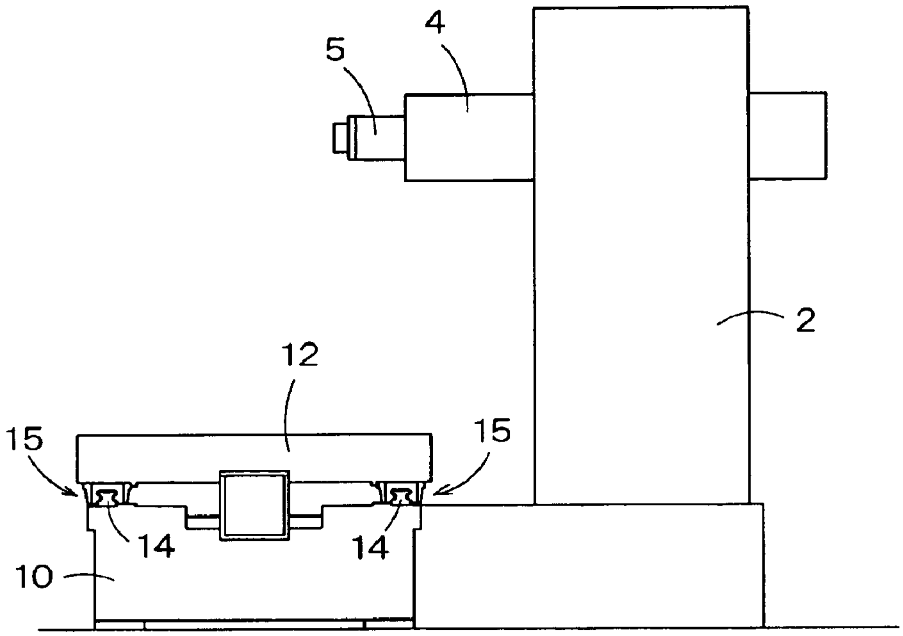
FIG. 1 is a side view showing a machine tool to which a linear guide apparatus according to the present invention is applied.

FIG. 1 is a side view showing a machine tool to which a linear guide apparatus according to the present invention is applied. In FIG. 1, the reference numeral 10 designates a bed and 2 designates a column. A spindle head 4 is vertically movably mounted to the column 2. The reference numeral 5 designates a spindle. A table 12 is provided on the bed 10, and moves back and forth on the bed 2.

In the below-described embodiments, a linear guide apparatus according to the present invention is applied as a guide for the table 12.

<First Embodiment>

Figure 2:
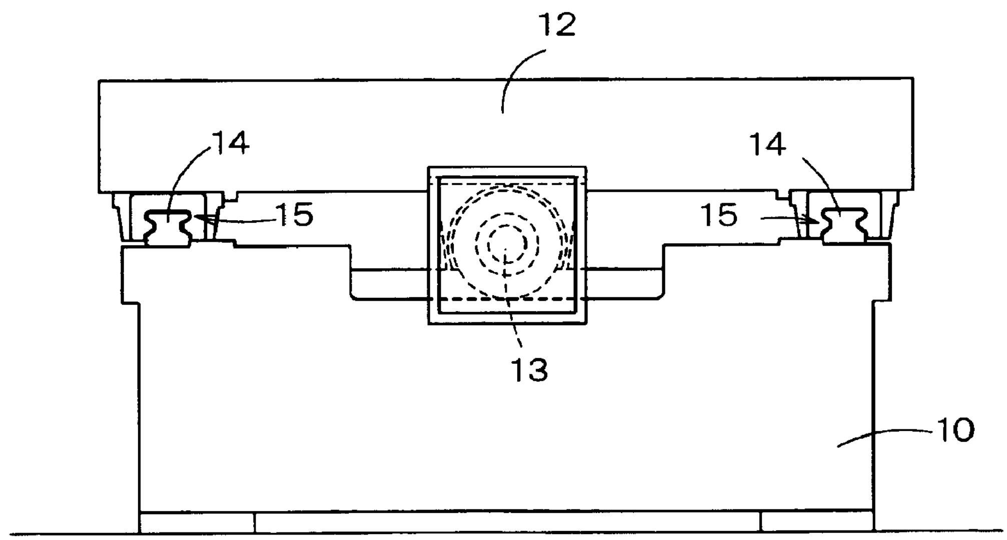
FIG. 2 is a front view showing, together with a table, a linear guide apparatus according to a first embodiment of the present invention.

FIG. 2 shows, together with a table, a linear guide apparatus according to a first embodiment of the present invention as viewed from the front in the moving direction of the table. This embodiment relates to application to a roller-type rolling guide for guiding a table in a machine tool.

In FIG. 2, the reference numeral 10 designates a bed and 12 designates the table. A ball screw 13, constituting a feed mechanism for the table 12, is provided on the upper surface of the bed 10. A pair of guide rails 14, disposed on either side of the ball screw 13, is laid in parallel with the axial direction of the ball screw 13. Guide units 15, each constituting the linear guide apparatus of this embodiment, are mounted to the lower surface of the table 12 each in engagement with the guide rail 14.

FIG. 3 is a side view of the linear guide apparatus of this embodiment.

As shown in FIG. 3, each guide unit 15 comprises a rolling guide section 16 and a brake section 17, disposed on the guide rail 14. A total of 4 guide units 15 are mounted to the front and back portions on either side of the table 12 shown in FIG. 2. According to this embodiment, the rolling guide section 16 and the brake section 17 are designed as separate components. It is, however, possible to provide the two sections as an integral structure. Further, though in this embodiments the brake sections 17 are of the same number as the rolling guide sections 16, the number of the brake sections 17 may not necessarily be the same as the rolling guide sections 16, i.e., more or fewer brake sections than rolling guide sections may be employed depending upon the machine to which the apparatus of the present invention is applied.

As shown in FIG. 4, the rolling guide section 16 is a known rolling unit having a plurality of rollers 18 within it. On either side of the guide rail 14, generally V-shaped guide grooves 19 extend in the longitudinal direction. The upper and lower surfaces of the guide grooves 19 have roller-rolling surfaces 19*a*, 19*b* on which the rollers 18 roll. The roller-rolling surfaces 19*a*, 19*b* are symmetrical horizontally and vertically, forming an angle of 90° with each other. The guide unit 15 is so designed that the full weight load of the table 12 is received by the rolling guide section 16, whereas no weight load is applied from the table 12 to the brake section 17.

Figure 5:
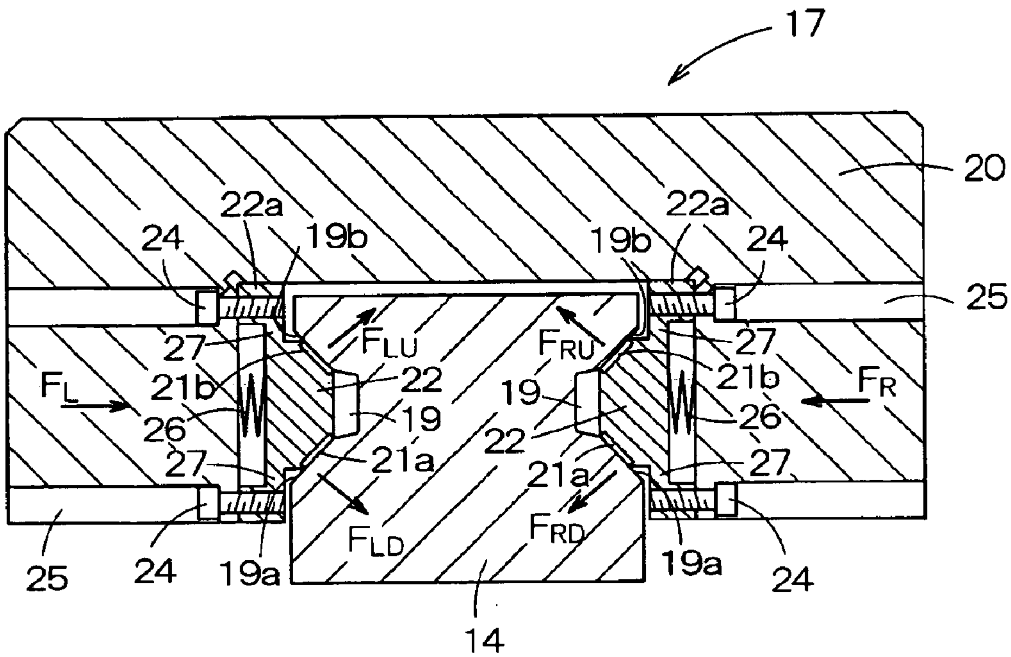
FIG. 5 is a cross-sectional view of the brake section of the linear guide apparatus.

FIG. 5 shows a cross-sectional view of the brake section 17. In FIG. 5, the reference numeral 20 designates amounting block that constitutes the body of the brake section 17, and 22 designates brake shoes.

The mounting block 20 of the brake section 17 is a steel block having a U-shaped cross-section. Each brake shoe 22 is a steel shoe which has a generally trapezoidal cross-section, corresponding to the shape of the guide groove 19, so that the shoe as a whole can closely fit the guide groove 19. The inclined surfaces of the brake shoe 22 are sliding surfaces which slide on the roller-rolling surfaces 19*a*, 19*b* of the guide rail 14. According to this embodiment, plate-shaped sliding members 21*a*, 21*b*, mounted to the brake shoe 22, slide on the roller-rolling surfaces 19*a*, 19*b*. The sliding members 21*a*, 21*b* may preferably be made of a fluororesin, in particular a polytetrafluoroethylene Turcite (trade name, available from Busak+Shamban K.K.). A metal shoe may also be used. In that case, a solid lubricant may be embedded in the surfaces of the sliding members 21*a*, 21*b*. Alternatively, it is possible to use an oil-free sliding member, for example Oiles (trade name, available from Oiles Corporation), which is impregnated with a lubricating agent.

Compression springs 26 are disposed in the space between the back surface of the brake shoe 22 and the inner side surface of the mounting block 20, so that the brake shoe 22 is pressed against the roller-rolling surfaces 19*a*, 19*b* at an appropriate pressure by the elastic force of each compression spring 26. The brake shoe 22 itself has thin portions 27 which are designed to be bent by the force applied from the compression spring 26.

The brake shoe 22 has in the peripheral portion flange portions 22*a*, and a plurality of adjustment bolts 24 are screwed into the flange portions 22*a* symmetrically with respect to the center. The brake shoe 22 is fastened, against the elastic force of the compression springs 26, to the inner side surface of the mounting block 20 by means of the bolts 24. The adjustment bolts 24 are inserted from bolt holes 25 that penetrate the side portion of the mounting block 20.

As shown in FIG. 3, end plates 30, 31 are mounted to the ends of the brake section 17. The end plates 30, 31 function to remove dust adhering to the roller-rolling surfaces 19*a*, 19*b* of the guide rail 14. The same end plates 30, 31 are provided also in the guide section 16.

A detailed description will now be given of the pressing force that presses the brake shoes 22 against the guide rail 14 in the brake section 17.

As a result of experiments carried out by using the linear guide apparatus of this embodiment, it has been found that when table 12 of an about one-meter square is supported by the rolling guide sections 16 consisting of four units, two and two on either side of the table, each unit specifically being #55 Linear Roller Way manufactured by Nippon Thomson Co., Ltd., the degree of damping increases about threefold by application of about 1000 N pressing force by each unit of the brake section 17, as compared to the case of applying no pressing force, achieving an adequate enhancement of damping capacity.

In this connection, referring to FIG. 5, $F_{RU}$, $F_{RD}$, $F_{LU}$ and $F_{LD}$ designate the pressing forces that press the sliding members 21*a*, 21*b* of the brake shoes 22 against the roller-rolling surfaces 19*a*, 19*b* of the guide rail 14. The total pressing force F is as follows:

$$F=F_{RU}+F_{RD}+F_{LU}+F_{LD}=1000\ (\mathrm{N})$$

Because of the horizontal and vertical symmetry, the pressing force applied to each of the roller-rolling surfaces 19*a*, 19*b* of the guide rail 14 is as follows:

$$F_{RU}=F_{RD}=F_{LU}=F_{LD}=1000/4=250\ (\mathrm{N})$$

Assuming that the sliding members 21*a*, 21*b* each have a width of 8 mm and a length of 120 mm, the specific pressure applied to each of the sliding members 21*a*, 21*b* will be determined as follows:

$$250/0.8\times1.2=26\ (\mathrm{N/cm^2})$$

The pressure value thus determined falls within a proper pressure range in a practical point of view in the case of utilizing the roller-rolling surfaces 19*a*, 19*b* as sliding surfaces for the brake shoes 22.

With respect to the compression springs 26 of the brake section 17, on the other hand, the forces $F_R$, $F_L$ nipping the guide rail 14 from either side can be calculated as follows:

$$F_R=F_L=F_{RU}/\sqrt{2}+F_{RD}/\sqrt{2}=354\ (\mathrm{N})$$

Thus, the compression springs 26, 26 on either side of the guide rail 14 must have such a spring force as to nip the guide rail 14 at 354 N.

While the table 12 is moving, it is guided by the rolling guide sections 16. Taking the advantage of rolling guides, the table 12 can be transferred at a high speed.

Further, when the table 12 is moving, the brake shoes 22 are pressed against the roller-rolling surfaces 19*a*, 19*b* by the above-described pressing force F, whereby an appropriate frictional force is generated. Accordingly, as described above, the degree of damping increases about threefold as compared to the case of not generating a frictional force, enabling effective damping of cutting vibrations during machining. Further according to the present brake section, each brake shoe 22 is made to closely fit the guide groove 19, defining the roller-rolling surfaces 19*a*, 19*b*, by utilizing the simple shape of the brake shoe, while the brake shoe 22 is spring-biased by the compression spring 26. In addition, the thin portions 27 are provided in the brake shoe 22, so that the brake shoe 22 has such a flexible structure that it can bend by the elastic force of the compression spring 26. Thus, the brake section 17 of this embodiment, unlike the conventional braking mechanisms, does not have a complicated mechanism or a hard structure which could form a gap between a brake shoe and a guide rail. The brake section 17 does not form even a slight gap between the brake shoe 22 and the guide rail 14, and can securely provide a sufficient damping capacity to the linear guide apparatus.

The sliding members 21*a*, 21*b* mounted to the brake shoe 22 wear gradually during a long period of operation of the apparatus. However, since a constant force from the compressing springs 26 keeps acting on the brake shoe 22, a change in the frictional force due to the wear of the brake shoe can be made extremely small. Further, the use of Turcite, which has excellent sliding properties, for the sliding members 21*a*, 21*b* or the use of Oiles sliding members makes it possible to maintain the damping capacity over a long period of time without maintenance and without causing damage to the roller-rolling surfaces 19*a*, 19*b* of the guide rail 14.

<Second Embodiment>

The second embodiment relates to application of the present invention to a ball-type rolling guide. Instead of the known rolling guide using the rollers 18 employed in the first embodiment, a known rolling guide using balls is employed in this embodiment.

Figure 6:
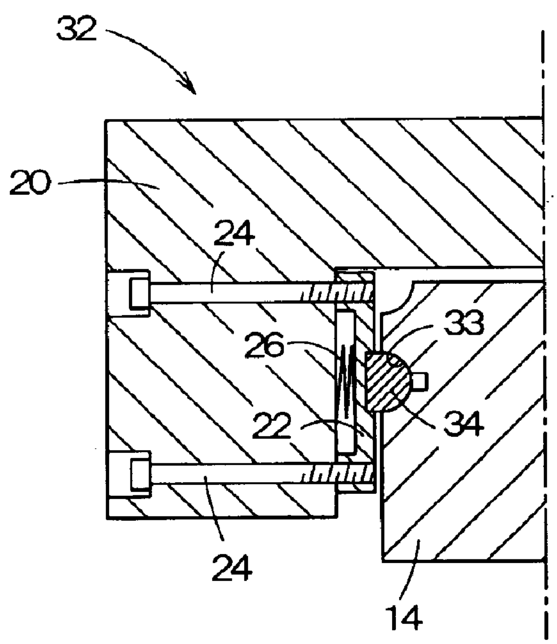
FIG. 6 is a cross-sectional view, partly omitted, of the brake section of a linear guide apparatus according to a second embodiment of the present invention.

FIG. 6 shows a cross-sectional view of the brake section 32 of this embodiment. Guide grooves 33, each having a semicircular cross-section, are formed in the both side surfaces of the guide rail 14. The curved surface of each guide groove 33 serves as a ball-rolling surface.

A sliding member 34, which slides on the ball-rolling surface of the guide groove 33, is provided integrally in each of the brake shoes 22. The sliding member 34 has a curved surface, whose curvature is made the same as that of the curved surface of the guide groove 33 so that the sliding member 34 closely fits the guide groove 33, and extends in the long direction of the guide rail 14. As with the first embodiment, a resin sliding member or an oil-free metal sliding member, such as the above-described Turcite or Oiles, may be used as the sliding member 34.

The components according to the second embodiment, other than the brake shoes 22, are the same as the first embodiment. The same components are given the same reference numerals, and a description thereof is herein omitted.

As described hereinabove, the present invention is applicable not only to a roller-type rolling guide but also to a ball-type rolling guide. The brake section according to the present invention, unlike the conventional braking devices, has a soft structure and does not have a complicated mechanism or a hard structure which could form a gap between a brake shoe and a guide rail, and can therefore securely provide a sufficient damping capacity to the linear guide apparatus.

<Third Embodiment>

FIG. 7 shows the brake section of the linear guide apparatus according to a third embodiment of the present invention. The third embodiment adds to the brake section 17 of the first embodiment, shown in FIG. 5, pressing force adjustment bolts 42 for fine adjustment of the pressing force of the brake shoes 22. The other components are the same as those of the brake section 17 of FIG. 5.

Screw holes 41, penetrating the side portions of the mounting block 20, are provided at locations corresponding to the compression springs 26 disposed in the long direction, and the pressing force adjustment bolts 42 are screwed into the screw holes 41. The front end of each pressing force adjustment bolt 42 is in contact with the compression spring 26, while the rear end protrudes from the mounting block 20. The pressing force adjustment bolt 42 has a male screw portion formed over the full length of the bolt. The portion of bolt 42 protruding from the mounting block 20 is in screw engagement with a lock nut 43, and the pressing force adjustment bolt 42 is secured by the lock nut 43 to the mounting block 20.

According to the third embodiment having the above construction, the pressing force can be adjusted in the following manner: As the pressing force adjustment bolt 42 is screwed and advanced in the screw hole 42, the compression spring 26 is increasingly compressed, whereby the pressing force of the compression spring 26, acting on the brake shoe 22 to press it against the roller-rolling surfaces 19*a*, 19*b* of the guide rail 14, increases accordingly, whereas the pressing force decreases as the pressing force adjustment bolt 42 is moved back in the opposite direction. Accordingly, by adjusting the screwing degree of each pressing force adjustment bolt 42 and fastening the lock nut 43 to fix the screwing degree, the pressing force of the brake shoe 22 as a whole can be distributed evenly over the roller-rolling surfaces 19*a*, 19*b*.

<Forth Embodiment>

The fourth embodiment, shown in FIG. 8, relates to application of the preceding embodiment, i.e. the embodiment using the pressing force adjustment bolts 42 for evenly distributing the pressing force of the brake shoe 22, to a ball-type rolling guide. The fourth embodiment is the same as the second embodiment shown in FIG. 6 except for the provision of the pressing force adjustment bolts 42 shown in FIG. 8. The same components as the second embodiment are given the same reference numerals, and a description thereof is herein omitted.

According to the fourth embodiment, the pressing force of the brake shoe 22 can be distributed evenly over the ball-rolling surface of the guide groove 33.

While the linear guide apparatus of the present invention has been described with reference to the preferred embodiments which relate to application as a guide for a table of a machine tool, the present invention can also be applied to various other movable bodies of a machine tool, such as a spindle head, a saddle, a cross rail, etc.

As described hereinabove, the brake section of the linear guide apparatus according to the present invention, unlike the conventional braking devices, utilizes an elastic member as a biasing means, has a flexible structure, and does not have a complicated mechanism or a hard structure that could form a gap between a brake shoe and a guide rail. The addition of such a gap-free braking device to a conventional rolling guide can provide a sufficient damping capacity to the linear guide apparatus.

What is claimed is:

1. A linear guide apparatus for guiding a linear motion of a movable body along a guide rail on a fixed structure in a machine tool, comprising:

a rolling guide means including rolling elements for rolling on respective surfaces of the guide rail; and a brake means for enhancing the damping capacity of the rolling guide means, wherein said brake means includes a pair of brake shoes, having a flexible structure, for sliding on the rolling element-rolling surfaces of the guide rail, wherein an elastic member, biasing each brake shoe so that the brake shoes press on the rolling element-rolling surfaces of the guide rail, is provided in a rear of the respective brake shoe, and wherein each of the brake shoes has a thin portion that allows a bend of the respective brake shoe by the force applied from the respective elastic member.

2. The linear guide apparatus according to claim 1, wherein the sliding surface of each brake shoe is comprised of a resin sliding member.

3. The linear guide apparatus according to claim 1, wherein the sliding surface of each brake shoe is comprised of an oil-free metal sliding member.

4. The linear guide apparatus according to claim 1, wherein the rolling elements of the rolling guide means are rollers.

5. The linear guide apparatus according to claim 1, wherein the rolling elements of the rolling guide means are balls.

6. The linear guide apparatus according to claim 1, wherein each brake shoe is fastened to the brake means by a plurality of adjustment bolts which adjust the pressing force of the respective brake shoe so that it acts evenly on the respective rolling element-rolling surface of the guide rail.

* * * * *